United States Patent [19]
Wagner

[11] Patent Number: 5,906,166
[45] Date of Patent: May 25, 1999

[54] SEEDING ASSEMBLY INCLUDING SEED BOOT AND BOOT MOUNTED, RESILIENTLY BIASED PACKER WHEEL

[76] Inventor: Philip Gus Wagner, Box 103, Earl Grey, Saskatchewan, Canada, S0G 1J0

[21] Appl. No.: 08/734,576

[22] Filed: Oct. 17, 1996

[30] Foreign Application Priority Data

Oct. 18, 1995 [CA] Canada ................................ 2160839

[51] Int. Cl.$^6$ .................................................. A01C 07/00
[52] U.S. Cl. ........................... 111/170; 111/186; 111/195; 172/538
[58] Field of Search ........................... 111/152, 186–189, 111/191, 194–196, 170; 172/538

[56] References Cited

U.S. PATENT DOCUMENTS

| | | | |
|---|---|---|---|
| 322,841 | 7/1885 | Miskimen | 111/189 |
| 1,094,422 | 4/1914 | Bottom | 111/189 |
| 2,058,539 | 10/1936 | Welty et al. | 111/186 X |
| 2,341,795 | 2/1944 | Kriegbaum et al. | 111/194 X |
| 2,694,356 | 11/1954 | Haas | 111/186 X |
| 2,924,189 | 2/1960 | McLeod | 111/187 |
| 3,228,363 | 1/1966 | Gardner et al. | 111/186 X |
| 4,275,671 | 6/1981 | Baker | 111/186 X |
| 4,417,530 | 11/1983 | Kopecky | 111/186 X |
| 4,607,581 | 8/1986 | Kopecky | 111/189 X |
| 4,674,419 | 6/1987 | Kopecky | 111/189 X |
| 4,691,645 | 9/1987 | Anderson | 111/195 X |
| 4,714,033 | 12/1987 | Neumeyer | 111/194 |
| 4,926,767 | 5/1990 | Thomas | 111/187 |
| 5,025,736 | 6/1991 | Anderson | 111/152 |
| 5,033,398 | 7/1991 | Froc | 111/152 |
| 5,092,255 | 3/1992 | Long et al. | 111/167 |
| 5,161,472 | 11/1992 | Handy | 111/187 X |
| 5,309,852 | 5/1994 | Zimmerman | 172/538 X |
| 5,333,559 | 8/1994 | Hodapp et al. | 111/152 |
| 5,509,363 | 4/1996 | Zimmerman | 172/538 X |
| 5,537,942 | 7/1996 | Wickstrom | 111/186 X |
| 5,562,054 | 10/1996 | Ryan | 111/186 X |
| 5,562,055 | 10/1996 | Petersen | 172/538 X |

FOREIGN PATENT DOCUMENTS

| | | | |
|---|---|---|---|
| 1110117 | 10/1906 | Canada . | |
| 1242115 | 9/1920 | Canada . | |
| 1245513 | 11/1929 | Canada . | |
| 954020 | 8/1982 | U.S.S.R. | 111/196 |

*Primary Examiner*—Terry Lee Melius
*Assistant Examiner*—Victor Batson
*Attorney, Agent, or Firm*—Murray E. Thrift; Adrian D. Battison

[57] ABSTRACT

The present invention provides a seed boot and packer wheel for use with a cultivator particularly of the type for mounting directly on a cultivator shank. The seed boot and packer wheel comprise a seed boot, an attachment means fixing the seed boot to the cultivator shank adjacent a bottom edge of the shank and behind a sweep or other soil opener, a packer wheel, a packer wheel mounting means mounting the packer wheel directly onto the seed boot, and a horizontal spring for biasing the packer wheel downwards.

19 Claims, 7 Drawing Sheets

SEEDING ASSEMBLY INCLUDING SEED BOOT AND BOOT MOUNTED, RESILIENTLY BIASED PACKER WHEEL

FIELD OF THE INVENTION

The present invention provides a seed boot and packer wheel assembly for use with an air seeder and cultivator, and particularly such an assembly for mounting directly on a cultivator shank.

BACKGROUND

Seed boots and packer wheels are mounted on cultivators for seeding and fertilizing. Many of the known seed boots are mounted on the cultivator shanks with their discharge ends spaced well above the bottom of the soil openers. This arrangement can contribute to the improper spread of seed or placement of fertilizer.

Packer wheels currently being used which are biased downwards by coil springs are usually are not compact and do not leave enough clearance between the wheel, spring, and the bottom of the cultivator. This can cause a problem when large clumps of soil or rocks are encountered.

The seed boots and packer wheels currently being used are also often separate components. This requires that the components be fixed to the cultivator at different points and also contributes to them being less compact.

SUMMARY

According to the present invention there is provided a seeding boot and packing apparatus for mounting on a cultivator shank, said seeding boot and packing apparatus comprising:

a seed boot;

an attachment means for fixing the seed boot to the cultivator shank on a rear side of the cultivator shank;

a packer wheel arranged rearwards of the seed boot and being aligned to follow therebehind;

a packer wheel mounting means mounting the packer wheel on the seed boot;

and biasing means for biasing the packer wheel downwards.

To reduce bouncing of seed or fertilizer as it exits the seed boot, the seed boot has an upper section with a cross sectional area greater than the cross sectional area of the coupling for an air seeder hose. This results in a decrease in the speed of the air flow which propels the seed or fertilizer and thereby slows the seed or fertilizer as it enters the seed boot. As well the seed boot slopes downwards and forwards with the exit lying forward of and below a forwardmost wall of the seeder hose coupling. This causes the seed or fertilizer to contact the rearwardmost wall of the lower section of the boot, further slowing the seed or fertilizer before it exits the seed boot, thus reducing bouncing when the seed contacts the ground.

The seed boot and packer wheel have the further advantages of being compact with the packer wheel mounted on the back of the seed boot, and of being a combined unit fixed to the cultivator shank. In preferred embodiments, the packer has a substantially horizontal spring which leaves more clearance between the top of the packer wheel and the bottom of the cultivator frame.

According to a second aspect of the invention there is provided a seeding boot and packing apparatus for mounting on a cultivator shank, said cultivator shank including a soil opener means for working an area of ground, said seeding boot and packing apparatus comprising:

a first seed boot;

an attachment means for fixing the first seed boot to the cultivator shank on a rear side of the cultivator shank;

at least one second seed boot arranged to lie laterally of the first seed boot and being aligned with the soil opener means to follow therebehind; po at least one packer wheel arranged rearwards of the at least one second seed boot and being aligned to follow therebehind;

a mounting means for mounting the at least one packer wheel and the at least one second seed boot on the first seed boot;

and biasing means for biasing the at least one packer wheel downwards.

The invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
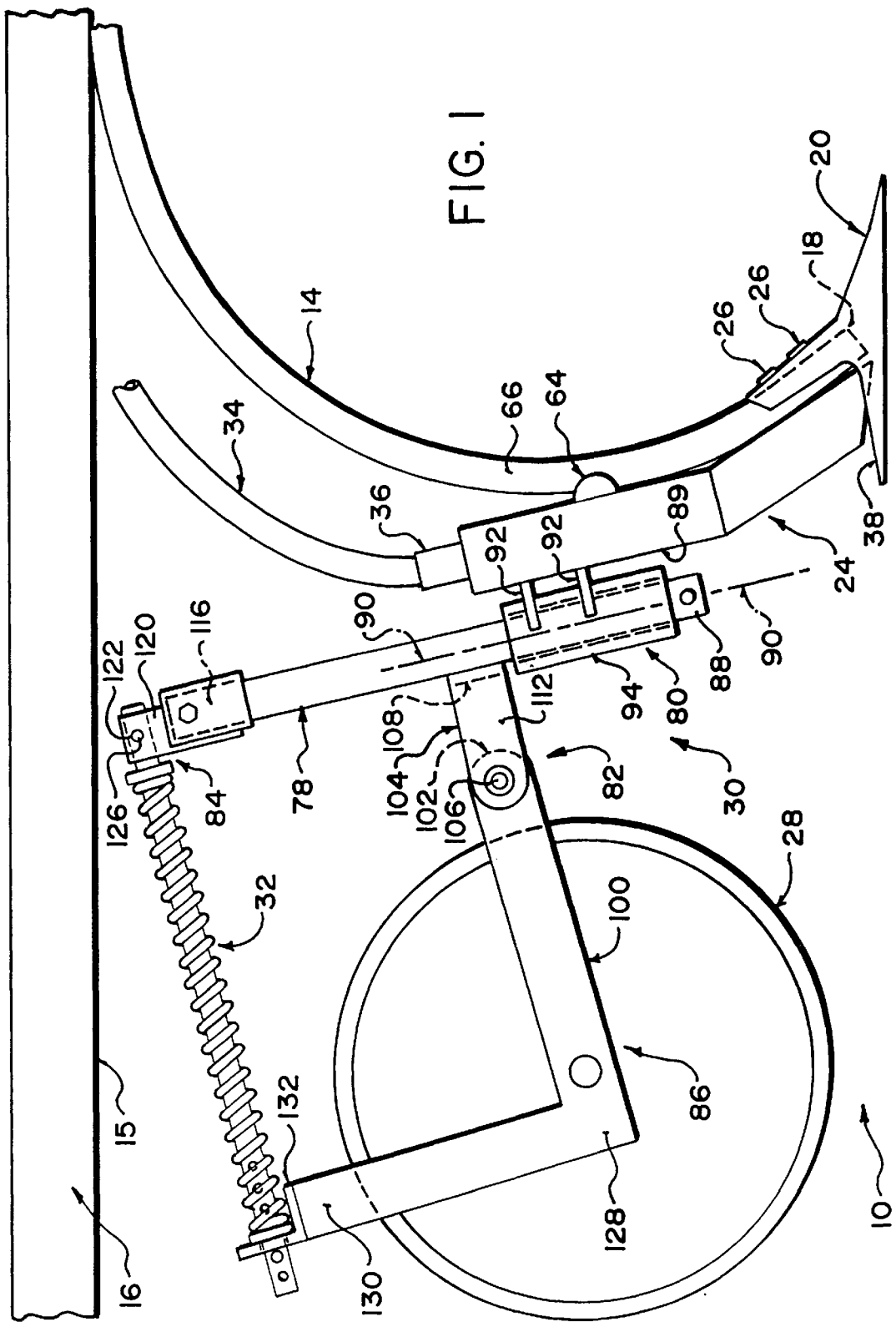
FIG. 1 is a side view of the seed boot and packer wheel.
Figure 2:
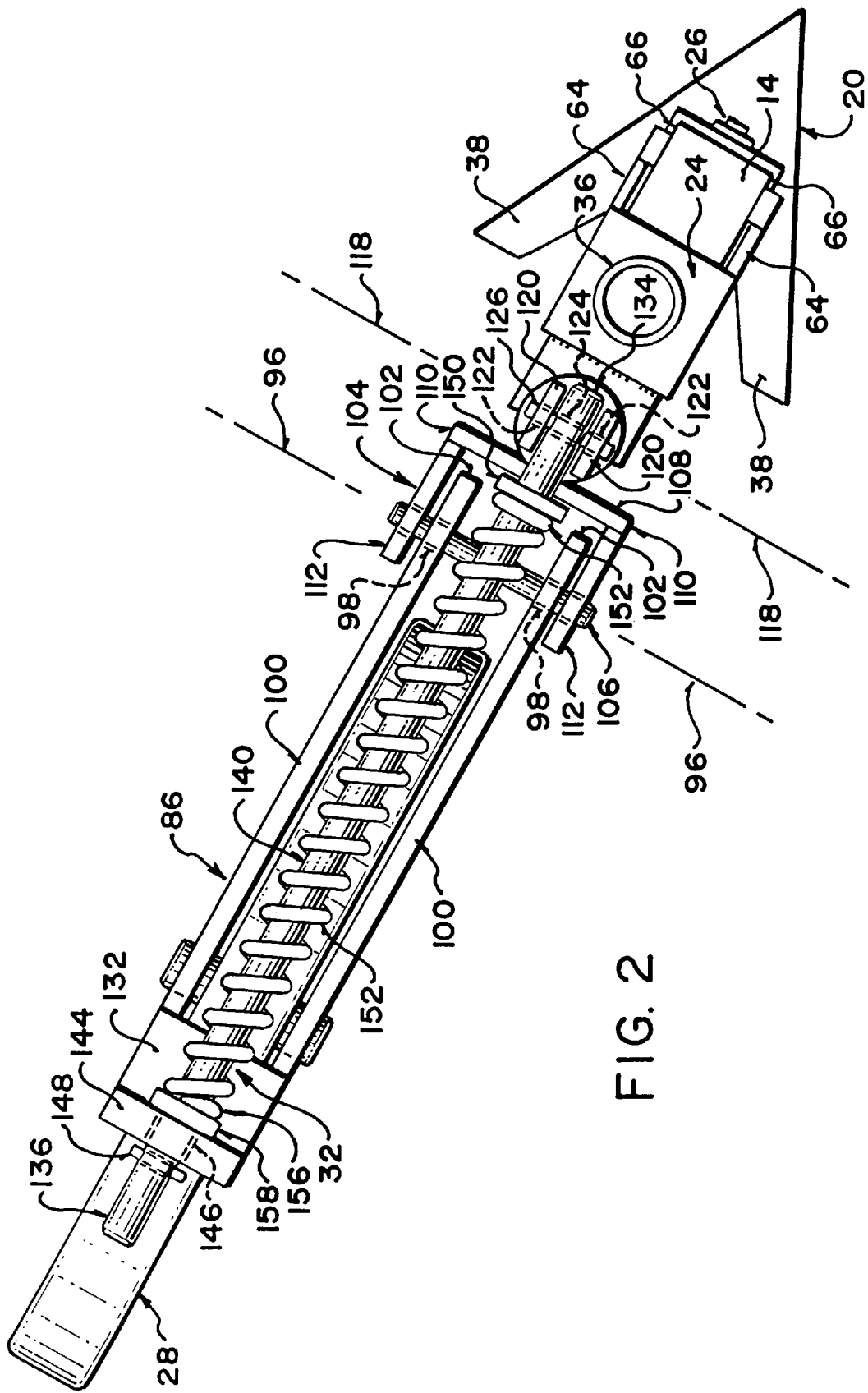
FIG. 2 is a top view of the seed boot and packer wheel.

Referring to FIGS. 1 and 2 the seed boot and packer wheel is shown generally at 10. The seed boot and packer wheel 10 is mounted on a cultivator which has a cultivator shank 14 that extends downwards from the bottom 15 of the cultivator frame 16 to a bottom end 18, and a soil opener sweep 20 fixed to the bottom end 18 of the cultivator shank 14. The seed boot and packer wheel 10 comprises a seed boot 24, attachment means 26 fixing the seed boot to the cultivator shank 14, a packer wheel 28, a packer wheel mounting means 30 mounting the packer wheel directly onto the seed boot, and biasing means 32 for biasing the packer wheel downwards.

The seed boot 24 is arranged rearwards of the cultivator shank 14 and the sweep 20, and is aligned to follow behind the sweep 20 between the wings 38 of the sweep 20. The seed boot 24 is connected at its top end by a coupling 25 to the outlet end 36 of an airline 34 and receives the seed or fertilizer from the air line 34. The air line 34 delivers seed, fertilizer, or other granular material propelled along the tube by pressurized air.

Figure 3:
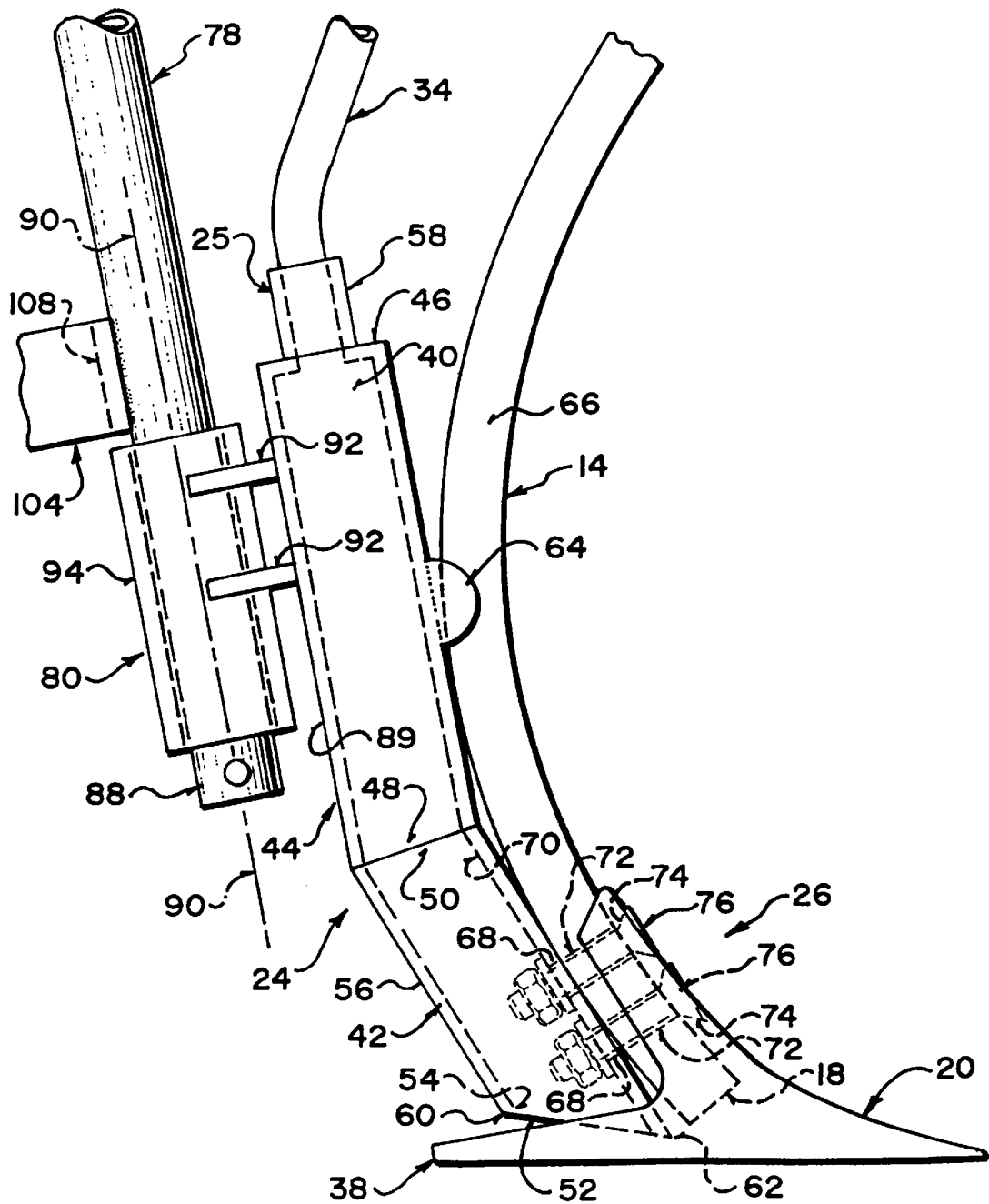
FIG. 3 is a side view of the seed boot.

Referring to FIGS. 1 and 3 the seed boot 24 has a cross sectional area greater than the cross sectional area of the coupling 25. This results in a decrease in the speed of the pressurized air which propels the seed or fertilizer and thereby slows the seed or fertilizer as it enters the seed boot 24. Slowing the seed or fertilizer reduces the occurrence of the seed or fertilizer bouncing as is exits the seed boot 24.

The seed boot 24 comprises a hollow tubular member 44 which has an upper section 40 and a lower section 42. The upper section 40 is fixed at a first end 46 to the coupling 25.

The upper section 40 is aligned with the coupling 25 and extends downwards to a second end 48. The lower section 42 is fixed at a first end 50 to the second end 48 of the upper section 40. The lower section 42 slopes downwards and forwards from the first end 50 to an open second end 52.

The lower section 42 slopes such that a bottom end 54 of a rearwardmost wall 56 of the lower section 42 lies forward of and below a forwardmost wall 58 of the coupling 25. This causes the seed or fertilizer to strike the rearwardmost wall 56 of the lower section 42, further slowing the seed or fertilizer before it exits the open second end 52 of the seed boot 24 further reducing bouncing when the seed contacts the ground.

The open second end 52 provides an exit for the seed or fertilizer and slopes from a rear end 60 adjacent the bottom edge 54 of the rearwardmost wall 56 downwards and forwards to a front bottom edge 62. The front bottom edge 62 lies adjacent the bottom end 18 of the cultivator shank 14. This arrangement positions the exit of seed boot 24 closer to the ground than current seed boots and helps to further reduce problem of seeds bouncing out of the furrow when the seed contacts the ground.

Referring to FIGS. 2 and 3 the attachment means 26 fix the seed boot 24 to the cultivator shank 14 aligning the seed boot 24 behind the cultivator shank 16, and fixing the seed boot 24 to the bottom of the cultivator shank 16. The attachment means 26 include a pair of forwardly extending flanges 64. The flanges 64 are spaced apart and arranged to engage opposing sides 66 of the cultivator shank 14 thereby holding the seed boot 24 in line behind the shank 14.

The seed boot 24 is fixed to the bottom end of the cultivator shank 14 and sweep 20 by a pair of bolts 76. The pair of bolts 76 extend through aligned pairs of holes 68, 72, and 74 in the seed boot 24, the cultivator shank 16, and the sweep 20. The seed boot 24 has a pair of holes 68 through a front wall 70 of the lower section 42. The cultivator shank 14 has a pair of holes 72 adjacent its bottom end 18, and the sweep 20 includes a pair of holes 74 in an upwardly extending portion 76. The pairs of holes 68, 72, and 74 in the seed boot 24, cultivator shank 16, and sweep 20 are arranged to cooperate with one another to receive the pair of bolts 76.

Referring to FIG. 1 the seed boot and packer wheel 10 have the further advantages of being compact with the packer wheel 28 mounted on the back of the seed boot 24, and of having a substantially horizontal biasing means 32 which leaves more clearance between the top of the packer wheel 28 and the bottom 15 of the cultivator 16.

The packer wheel 28 is arranged rearwards of the seed boot 24 and is aligned to follow behind the seed boot 24 and to swivel in a castoring manner as it follows the seed boot 24. The packer wheel 28 is mounted on the seed boot by packer wheel mounting means 30. The packer wheel mounting means 30 comprise a standard 78, a first pivot connection 80, a second pivot connection 82, a third pivot connection 84, and a clevis member 86.

The standard 78 is an elongate member and is connected at the bottom end 88 to the seed boot 24 by the first pivot connection 80. The first pivot connection 80 connects the standard 78 to a rear face 89 of the seed boot 24 and has an axis of rotation 90 lying in a vertical plane and sloping upwardly to the rear to permit castoring of the packer wheel 28. The first pivot connection 80 includes a pair of spaced apart flanges 92, and a hollow cylindrical member 94 lying in a vertical plane. Each flange 92 extends rearwards from the rear face 89 to a rear end. The hollow cylindrical member 94 is fixed to the rear of each of the flanges 92 and accepts a bottom end 88 of the standard 78.

Referring to FIGS. 1 and 2 the second pivot connection 82 is fixed to the standard 78 spaced from the bottom end 88, and is arranged to have an axis of rotation 96 lying in a horizontal plane perpendicular to a direction of forward movement of the cultivator. The second pivot connection 82 includes a hole 98 in each of the first and second L-shaped members 100 adjacent the first ends 102 thereof. The holes 98 are arranged to align with one another. A yoke member 104 is fixed to the standard 78 at a position spaced upwards from the bottom 88 of the standard 78, and a pin member 106 extends through the aligned holes 98 in the first and second L-shaped members and is fixed at each end to the yoke 104.

The yoke 104 comprises an elongate member 108 spaced upwards from the bottom 88 of the standard 78 and is fixed thereto. The elongate member 108 extends laterally outwards from the standard 78 to opposing ends 110. A flange 112 extends rearwards from each of the opposing ends 110 of the elongate member 108, and the pin member 106 extends between each respective flange 112.

The third pivot connection 84 is fixed to the standard adjacent the top end 116 thereof, and is arranged to have an axis of rotation 118 lying in a horizontal plane perpendicular to the direction of forward movement of the cultivator. The third pivot connection 84 comprises a pair of spaced apart flanges 120 extending upwards from the top end 116 of the standard 78. Each flange 120 has a hole 122 extending laterally through it. A hole 124 also extends through the biasing means 32, is spaced from the first end of the biasing means, and is arranged to cooperate with the holes 122 in each of the respective flanges 120. A pin member 126 extends through the cooperating holes 122 and 124 and is fixed to a respective one of the spaced apart flanges 120 at each of its ends.

The clevis member 86 includes the first and second L-shaped members 100. The L-shaped members 100 are arranged side by side and spaced apart from one another, each L shaped member 100 is connected to the second pivot connection 82 at the first end 102, extending rearwards therefrom to a corner 128 and then extending upwards from the corner 128 to a second end 130. A cross member 132 extends between each of the second ends 130 of the L-shaped members 100. The packer wheel 28 is arranged between the first and second L-shaped members 100 and is rotatably mounted on the L-shaped members 100 at a location spaced from the corner 128 towards the first end 102 of the members 100.

Figure 4:
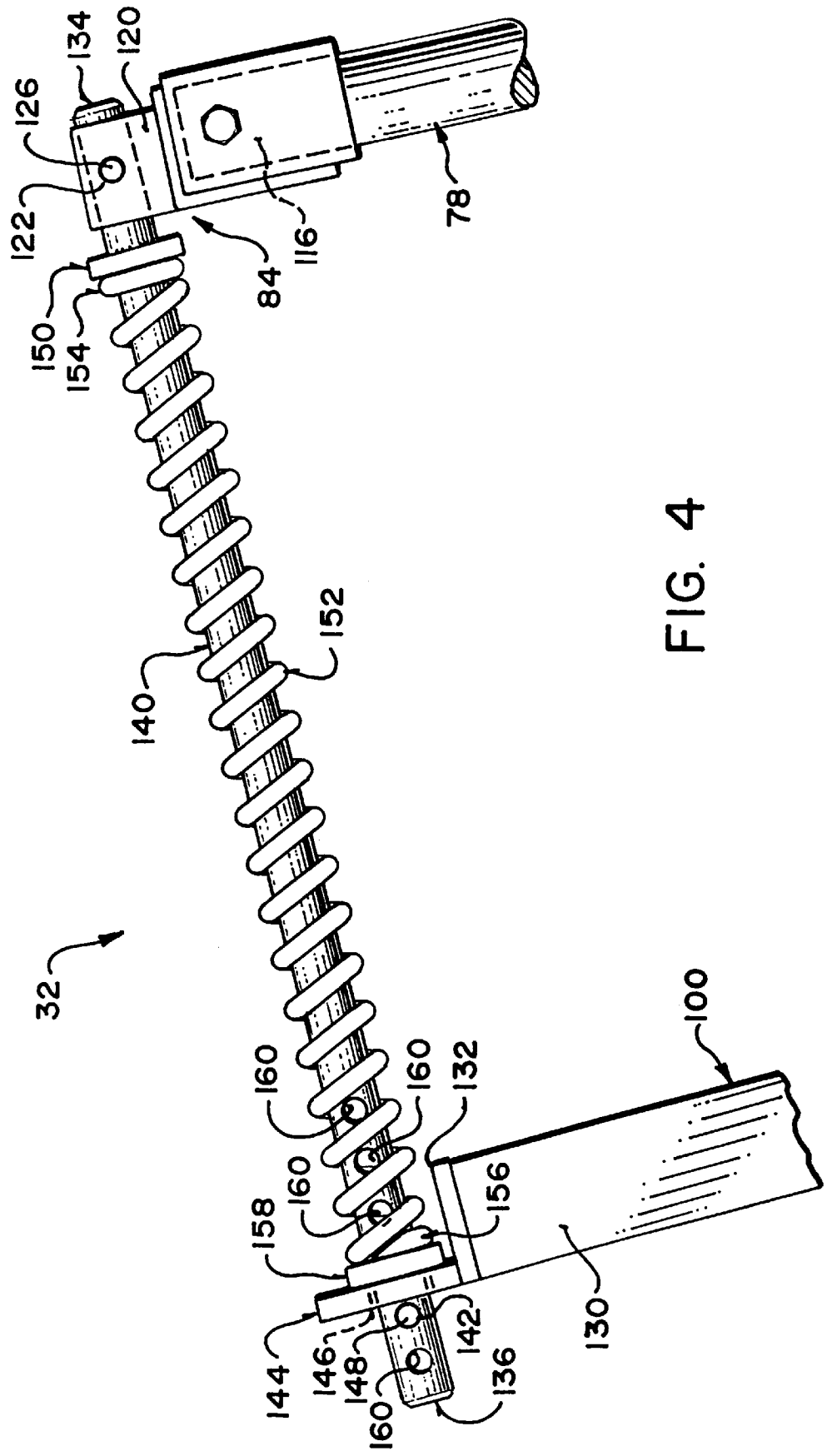
FIG. 4 is a side view of the coil spring member.

Referring to FIGS. 1 and 4 the biasing means 32 bias the packer wheel 28 downwards, and are arranged substantially horizontally lying above the packer wheel 28, and angling downwards and rearwards from a first end 134 to a second end 136. The biasing means 32 bias the clevis member 86 and the packer wheel 28 downwards, and are fixed at the first end 134 to the third pivot connection 84, and at the second end 136 to the cross member 132 between the second ends 136 of the L-shaped members 100.

The biasing means 32 comprise resilient means having an elongate member 140 extending from the first end 134 to the second end 136. A hole 124 is located through the elongate member 140 spaced from the first end 134 thereof, and another hole 142 is located through the elongate member 140 spaced from the second end 136 thereof. A flange 144 is fixed to the cross member 132 of the clevis 82 and extends upwards from the clevis 86. The flange 144 has a hole 146 therethrough for receiving the second end 136 of the elongate member 140. A removable and reengageable pin member 148 engages through the hole 142 in the elongate member 140, such that the flange 144 lies between the pin ember 148 and the first end 134 of the elongate member 140. A first collar member 150 is fixed to the elongate member 140 near the first end 134 thereof; and a coil spring 152 is arranged around the elongate member 140 having a first end 154 and a second end 156. The first end 154 of the coil spring 152 engages the first collar member 150. A second collar member 158 is arranged near the second end 136 of the elongate member 140 lying between the flange 144 and the second end 156 of the coil spring 152 for engaging the second end 154 of the coil spring 156 and holding it therebetween.

The biasing means 32 include adjustment means for adjusting spring tension and are arranged at the second end 136 of the biasing means 32. The adjustment means comprise a plurality of holes 160 spaced along the elongate member 140 near the second end 136 of the elongate member 140. The plurality of holes 160 are arranged for selectively receiving the pin member 126 therethrough, thereby allowing selective adjustment of a maximum distance between the first collar member 150 and the second collar member 158.

Figure 5:
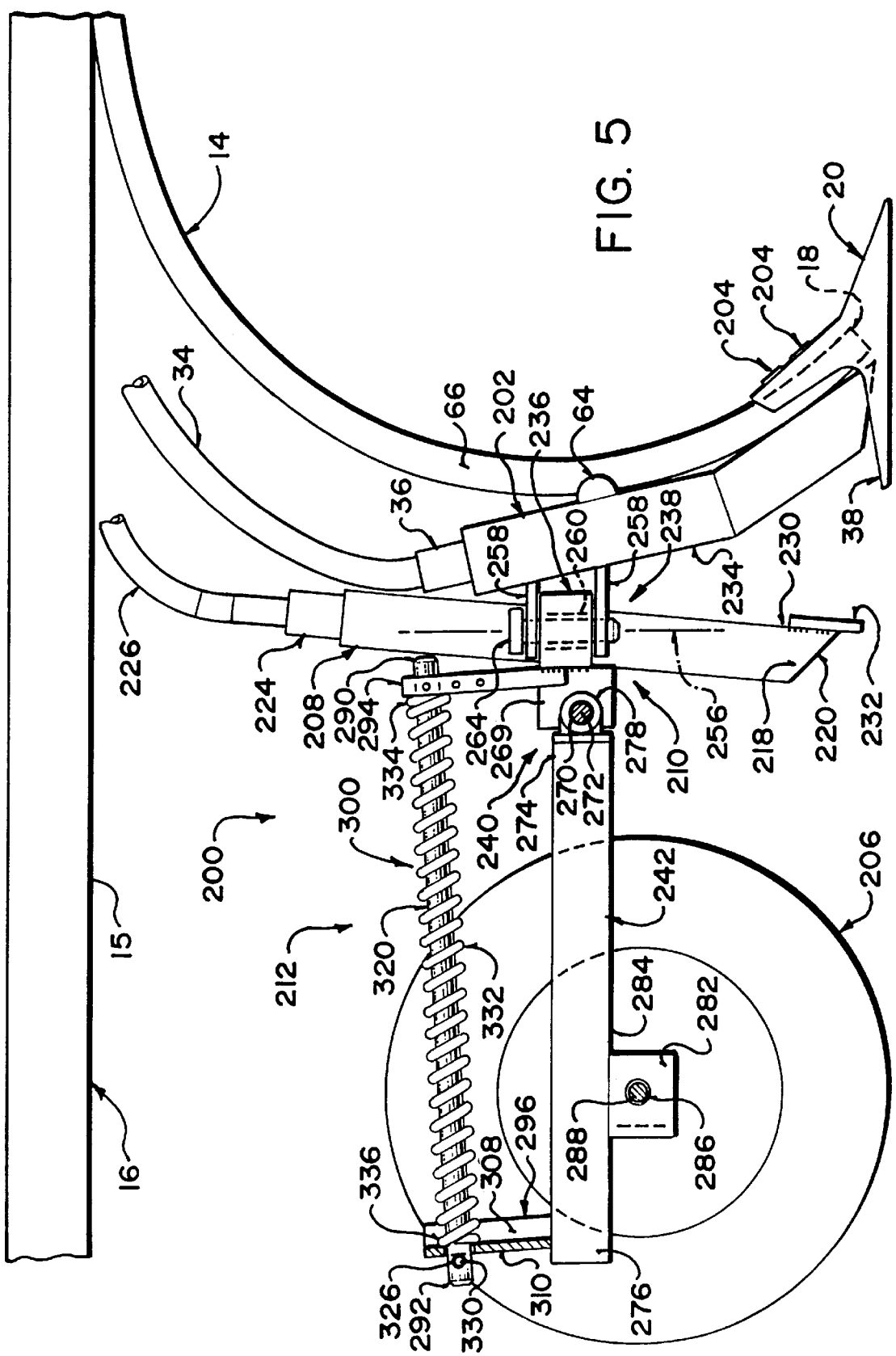
FIG. 5 is a side view of an alternative embodiment of the seed boot and packer wheel.

Referring to FIG. 5 an alternative embodiment of the seed boot and packer wheel is shown generally at 200. The seed boot and packer wheel 200 comprises a first seed boot 202, attachment means 204 fixing the seed boot to the cultivator shank 14, a pair of laterally spaced apart packer wheels 206, a pair of laterally spaced apart second seed boots 208, mounting means 210 for mounting the packer wheels to 206 and second seed boots 208 directly onto the seed boot 202, and biasing means 212 for biasing the packer wheel downwards. The first seed boot 202 and attachment means 204 are arranged substantially the same as the seed boot 24 and attachment means 26 described above. These therefore will not be described in detail in the following.

Figure 6:
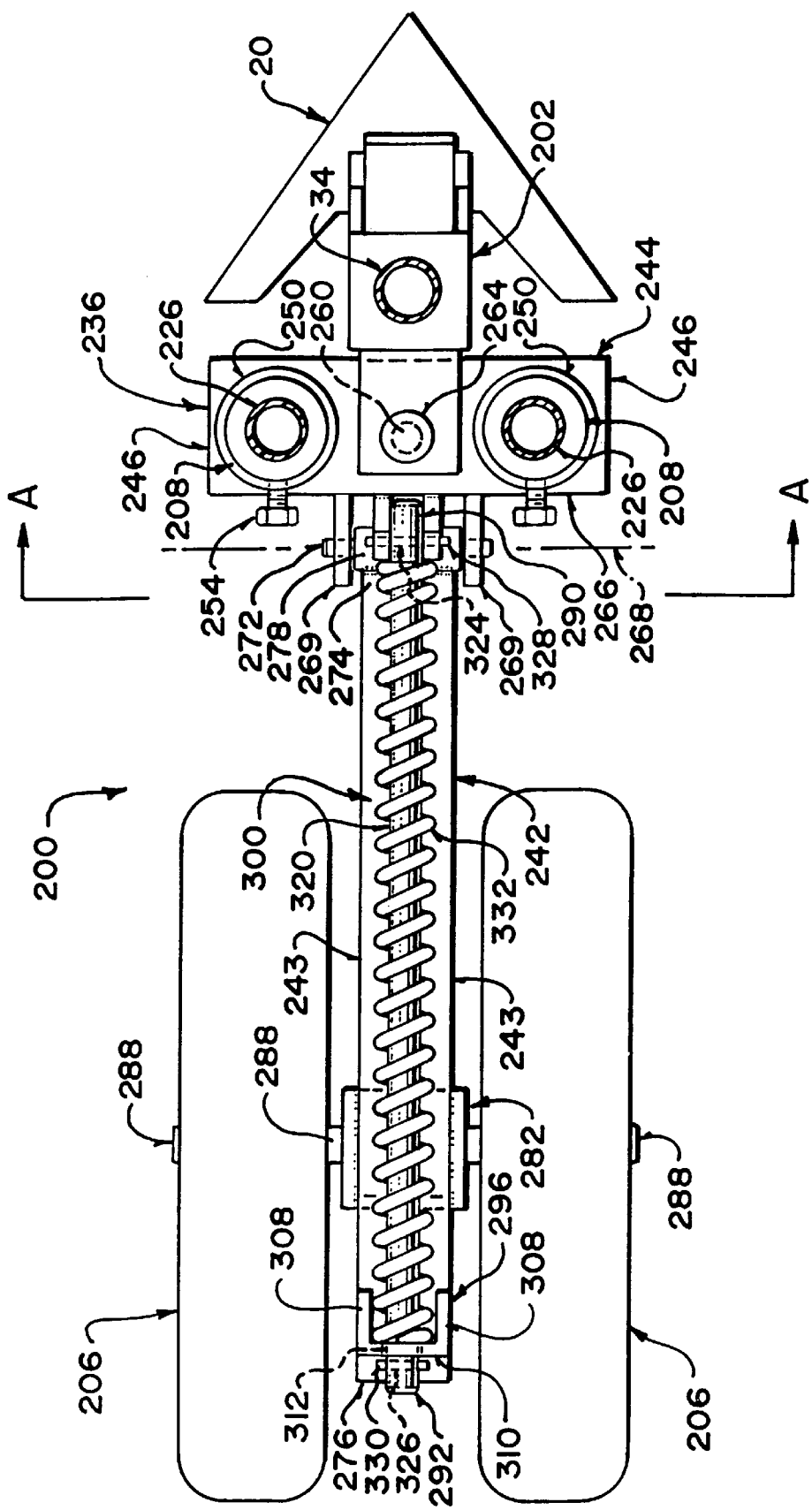
FIG. 6 is a top view of an alternative embodiment of the seed boot and packer wheel.
Figure 7:
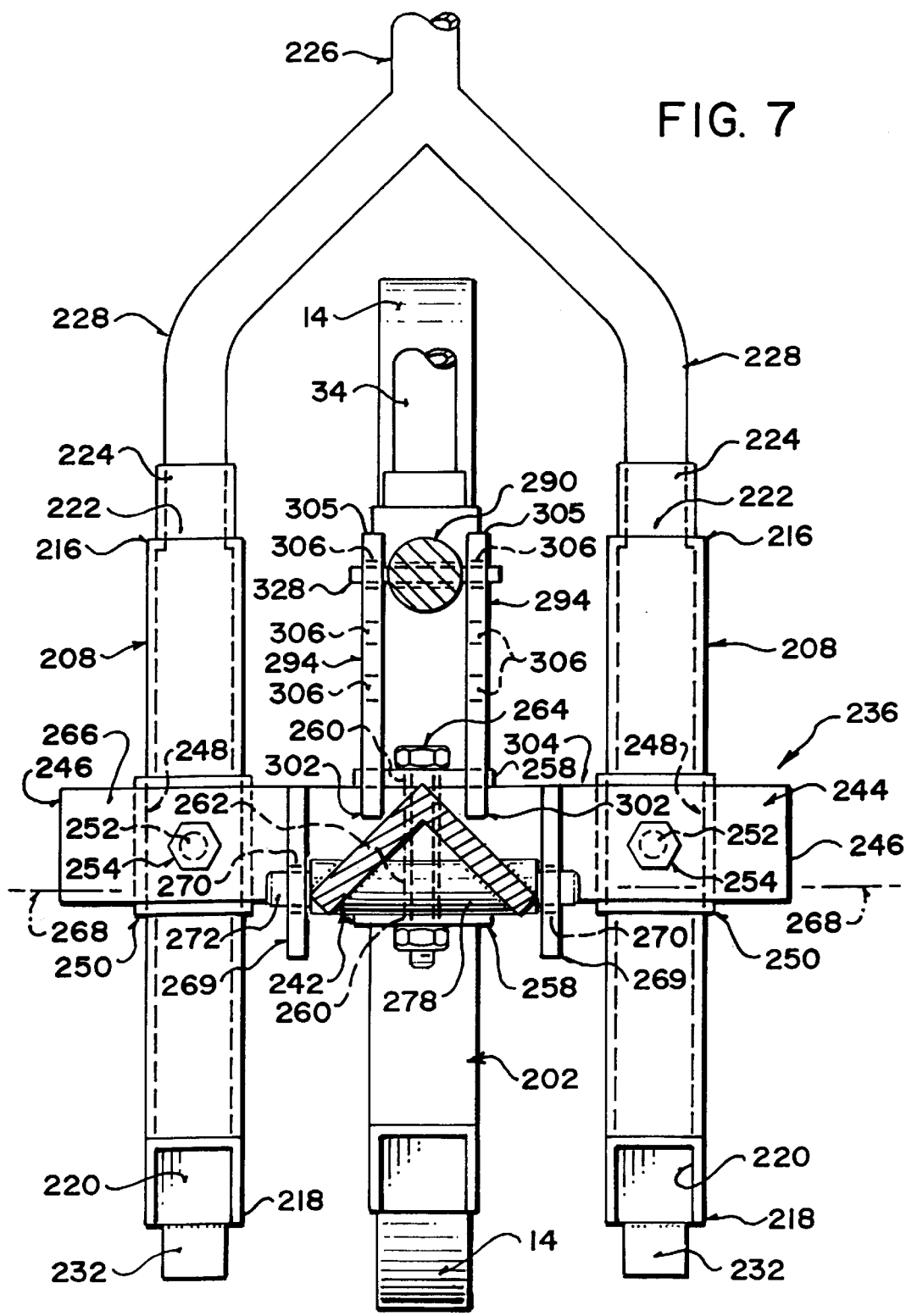
FIG. 7 is a rear view of the seed boot and packer wheel through lines A—A of FIG. 6.

Referring to FIGS. 5, 6, and 7 the seed boot and packer wheel 200 include a pair of second seed boots 208 which are arranged rearwards of the first seed boot 202. The second seed boots 208 are spaced apart and arranged to lie laterally of the first seed boot 202 such that one second seed boot 208 lies to each side of the first seed boot 202. The second seed boots 208 are arranged rearwards of the sweep 20 such that they are aligned with the sweep 20 to follow therebehind.

Each second seed boot 208 comprises an elongate hollow tubular member extending downwards and rearwards from a top end 216 downwards to a bottom end 218. The bottom end 218 is angled downwards and forwards and includes an opening 220 therein. The top end 216 of each second seed boot 208 is fixed to an outlet end 222 of an air hose coupling 224. The coupling 224 connects to an air seeder hose 226 which splits into two branches 228, one feeding each of the two second seed boots 208. The air seeder hose 226 provides a flow of granular material to the seeder hose outlet 222. The top end 216 of each second seed boot 208 receives the granular material which is conveyed along the length of the tube 208 to the opening 220 at the bottom end 218.

Each second seed boot 208 has a cross sectional area which is greater than the cross sectional area of the coupling 222. This reduces the speed of the granular material flowing from the hose 226 and into the seed boot 208.

Referring to FIGS. 5 and 7 a furrow opener 232 is fixed to a front side 230 of the bottom end 218 of each second seed boot 208 and extends downwards past the bottom end 218 of the second seed boot 208. The furrow opener 232 is arranged to engage the ground thereby causing a small furrow to be made in the ground as the seed boot travels over the ground. The small furrow receives seeds or other granular material exiting the opening to 220 in the seed boot 208.

Referring to FIGS. 5 and 6 the pair of packer wheels 206 are arranged rearwards of the second seed boots 208 and are aligned to follow therebehind. The packer wheels 206 and the second seed boots 208 are mounted on the first seed boot 202 such that they swivel in a castoring manner with the packer wheels following the second seed boots 208.

The mounting means 210 pivotally mount the packer wheels 206 and the second seed boots 208 to a rear face 234 of the first seed boot 202. The mounting means 210 comprise a seed boot mount 236, a first pivot connection 238, a second pivot connection 240 and an elongate wheel carrier 242.

Referring to FIGS. 5 and 7 the seed boot mount 236 comprises an elongate member 244 which extends laterally of the first seed boot 202 to ends 246 lying one on each side of the first seed boot 202. A hole 248 extends vertically through the seed boot mount adjacent each of its ends 246. Each hole 248 receives a cylindrical guide member 250 which is fixed with in the hole 248 and is arranged to guide a respective one of the seed boots 208. The guide member 250 is a hollow cylindrical member which includes a threaded hole 252 extending horizontally therethrough for receiving a threaded fastener 254 therein. Each one of the second seed boots 208 is slidably arranged in a respective guide member 250 and is held in place by the fastener 254 which is tightened in the hole 252 to engage a side of the second seed boot 208.

The seed boots 208 may be adjusted vertically by loosening the threaded fastener 254 in each of the guide members 250 and sliding the seed boots 208 vertically within the guide members 250 to a desired position. In this manner the second seed boots 208 can be vertically adjusted such that the furrow opener extending member 232 at the bottom end 218 of the seed boot is arranged to engage the ground.

Referring to FIGS. 5, 6, and 7 the first pivot connection 238 pivotally connects the seed boot mount 236 to a rear face 234 of the first seed boot 202. The first pivot connection 238 has an axis of rotation 256 lying in a substantially vertical plane. The first pivot connection allows castoring of the second seed boots 208 and the packer wheels 206.

The first pivot connection 238 comprises a pair of spaced apart flanges 258 fixed at a first end to the rear face 234 of the first seed boot 202 and extends rearwards therefrom to a free end. A hole 260 extends vertically through each of the spaced apart flanges 258 and are arranged to align vertically with one another. A hole 262 extends vertically through the elongate seed boot mount 236 between the ends 246 of the seed boot mount 236. The holes 260 and 262 are arranged to align with one another and a pin member 264 extends through said aligned holes thereby pivotally connecting the seed boot mount to the first seed boot 202.

The second pivot connection 240 is fixed to a rear face 266 of the seed boot mount 236. The second pivot connection 240 has an axis of rotation 268 lying in a horizontal plane and substantially parallel to the seed boot mount.

The second pivot connection 240 comprises a pair of spaced apart flanges 269 fixed at a first end to the rear face 266 of the seed boot mount 236 and extending rearwards therefrom to a free end. Each flange 269 includes a hole 270 extending laterally therethrough, said holes 270 being arranged to align with one another to receive a pin member 272 therethrough.

Referring to FIG. 5 and 6 the wheel carrier member 242 comprises a elongate inverted V-shaped channel member extending from a first end 274 connected to the first pivot connection 238 rearwards to a second end 276. Fixed at the first end 274 is a laterally extending tubular member 278. The tubular member 278 is arranged to align with the holes 270 of the second pivot connection 240 such that the pin member 272 can extend through the holes 270 and the tubular member 278 thereby pivotally connecting the wheel carrier member 242 to the seed boot mount 236, such that the wheel carrier member 242 may pivot about the horizontal axis 268.

A wheel mounting member 282 is fixed to a bottom 284 of the wheel carrier member 242 and extends downwards therefrom. The wheel mounting member 282 comprises a pair of spaced apart plates and a reinforcing web extending therebetween. The spaced apart plates are arranged laterally on either side of the wheel carrier member 242 and include a hole 286 therethrough for receiving an axle 288 mounting the pair of wheels 206 thereon. The wheels 206 are mounted such that one wheel 206 lies behind and on either side of the wheel carrier member 242 and is aligned with a second seed boot member 208 to follow therebehind.

The second seed boots 208 and the packer wheels 206 are mounted on the first seed boot 202 by the first pivot connection 238 such that they may pivot about the first pivot connection member in a castoring manner with the packing wheels 206 tracking behind the seed boots 208.

The biasing means 212, as in the embodiment above, are arranged to lie above the wheel carrier member 242 and are arranged substantially horizontally angling downwards and rearwards from a first end 290 to a second end 292.

Referring to FIGS. 5 and 7 the biasing means 212 comprise first connection members 294 fixed to the seed boot mount 236, a second connection member 296 fixed to the wheel carrier member 242 adjacent the second end 276 thereof, and a resilient means 300 extending there between.

The first connection member 294 comprises a pair of spaced apart upright members extending from a bottom end 302 fixed adjacent a top 304 of the seed boot mount 236 upwards to a top end 305. Each upright member 294 includes a plurality of holes 306 extending laterally therethrough and spaced apart along the length of the upright member 294.

Referring to FIGS. 5 and 6 the second connection 296 comprises a pair of spaced apart upright plates 308 fixed to sides 243 of the wheel carrying member 242 and a back plate 310 extending upwards from the wheel carrier member 242 and having a hole 312 for receiving the resilient means 300 therethrough.

The resilient means 300 comprise a elongate member 320 extending from the first end 290 to the second end 292. A first hole 324 extending laterally through the elongate member 320 and is spaced from the first end 290 thereof. And a second hole 326 extending laterally through the elongate member 320 at a location spaced from the second end 300 thereof. The first hole 324 is arranged to selectively align with a pair of align hole 306 in the upright members 294 to receive a pin member 328 therethrough. The pin member 328 secures the first end 290 of the elongate member 342 in place and allows it to pivot about a horizontal axis in response to upwards and downwards movement of the packing wheels as they move across the ground. The elongate member 320 is positioned such that the second end 292 extends through the hole 312 in the flange member 296 with the second hole 326 lying rearwards of the flange 296. The second hole 326 receives a pin member 330 or other similar fastening means therethrough such that the second end 292 of the elongate member 320 may only move in a rearwards direction relative to the flange member 296.

A coil spring 332 is arranged around the elongate member 320 and extends from a first end 334 adjacent the upright members 294 to a second end 336 adjacent the flange member 296, and engage the upright members 294 and flange member 296.

Moving the packer wheels 206 in an upwards direction causes the second end 276 of the wheel carrier member 242 moves upwards carrying the flange 296. This causes movement of the flange 296 forwards relative to the elongate member 320 causing compression of the coil spring 332. Compression of the spring 332 in turn causes a biasing force to be applied to the flange 296 which biases the flange 296, the carrier member 242, and wheels 206 downwards.

The tension on the coil spring 332 and therefore the downwards biasing force can be adjusted by moving the first end 290 of the elongate member 320 selectively between the holes 306 in the upright members 294.

In use the seed boot and packer wheel 200 is installed on a cultivator shaft 14 and the second seed boots 208 are adjusted such that the bottom end 218 lies adjacent the ground and the downwardly extending member 232 makes contact with the ground. As the equipment is operated the sweep 20 opens the ground allowing the first boot 202 to deposit fertilizer in the open ground behind the sweep and the second seed boots 208 to deposit two rows of seed one on either side of the fertilizer into open ground behind the sweep 20. The furrow opener 232 cause small furrows to be created as they move through the ground in which the seeds exiting the second seed boots 208 may enter. The packer wheels 206 follow the seed boots 208 as they move across the ground packing the seeds into the ground as they do so.

The present invention has been described in the foregoing, it is to be understood that other embodiments are possible within the scope of the invention. The invention is to be considered limited solely by the scope of the appended claims.

I claim:

1. A seed boot and packer apparatus for mounting on a cultivator shank, said apparatus comprising:

a seed boot;

attachment means for attaching the seed boot to the cultivator shank on a rear side of the cultivator shank;

packer wheel mounting means mounting the packer wheel on the seed boot, said mounting means comprising:

first pivot means having an upright castor axis and connecting the packer wheel to the seed boot for pivotal movement of the packer wheel about the castor axis, second pivot means having a lateral axis of rotation oriented transversely to a direction of forward movement and connecting the packer wheel to the first pivot means for pivotal movement about the lateral axis, and a wheel carrier connected to the second pivot means and extending rearwards therefrom, and a packer wheel rotatably mounted on said wheel carrier at a location spaced from the second pivot means; and biasing means for biasing the wheel carrier and the packer wheel to rotate downwards about the lateral axis of the second pivot means.

2. A seed boot and packer wheel in accordance with claim 1 wherein the cultivator shank has a bottom edge, the seed boot includes a front bottom edge and the attachment means comprise means for mounting the seed boot on the shank with the front bottom edge of the seed boot adjacent the bottom edge of the cultivator shank.

3. A seed boot and packer wheel in accordance with claim 2 wherein the seed boot includes a coupling for engaging an air seeder hose outlet; and an upper section for receiving a flow of granular material from the hose outlet, said upper section of the seed boot having a cross sectional area greater than a cross sectional area of the coupling such that the speed of the flow from the hose is decreased.

4. A seed boot and packer wheel in accordance with claim 3 wherein the seed boot comprises a hollow tubular member having an upper section fixed at a first end to an outlet end of the coupling for receiving said granular material, said upper section being aligned with the outlet end of the coupling and extending downwards to a second end; and a lower section fixed at a first end to the second end of the upper section, said lower section sloping downwards and forwards from the first end to an open second end such that a bottom end of a rearwardmost wall of the lower section lies forward of and below a forwardmost wall of the coupling and such that the granular material contacts the rearwardmost wall of the lower section before it exits the open second end.

5. A seed boot and packer wheel in accordance with claim 4 wherein the open second end of the lower section of the seed boot slopes from a rear end adjacent the bottom edge of the rearwardmost wall downwards and forwards to the front bottom edge.

6. A seed boot and packer wheel in accordance with claim 4 wherein the attachment means of the seed boot include a pair of forwardly extending flanges, said flanges being spaced apart and arranged to engage opposing sides of the cultivator shank thereby holding the seed boot in line behind the shank.

7. A seed boot and packer wheel in accordance with claim 1 wherein the packer wheel mounting means mount the packer wheel to a rear face of the seed boot.

8. A seed boot and packer wheel in accordance with claim 1 wherein the biasing means are arranged substantially horizontally, angling downwards and rearwards from a first end to a second end.

9. A seed boot and packer wheel in accordance with claim 8 wherein the biasing means are arranged to lie above the packer wheel.

10. A seed boot and packer wheel in accordance with claim 1 wherein:
the packer wheel mounting means comprise a standard mounted on the seed boot by the first pivot means, for rotation of the standard about the castor axis;
the second pivot means are mounted on the standard;
the wheel carrier comprises a clevis including first and second laterally spaced apart clevis members mounted on the second pivot means and extending rearwards therefrom; and
the packer wheel is positioned between the first and second clevis members and is rotatably mounted on said first and second clevis members.

11. A seed boot and packer wheel in accordance with claim 10 including third pivot means mounted on the standard above the second pivot means and having an axis of rotation substantially parallel to the lateral axis of the second pivot means and wherein the biasing means comprise resilient means extending between the third pivot connection, and the clevis.

12. A seed boot and packer wheel in accordance with claim 11 wherein the biasing means comprise an elongate member mounted on the third pivot means and extending rearwardly therefrom, the resilient means include an elongate coil spring surrounding the elongate member and two spring engaging means mounted on the elongate member and the clevis and including adjustment means for adjusting the spacing between the two spring engaging means.

13. A seed boot and packer apparatus for mounting on a cultivator shank, said apparatus comprising:
a first seed boot;
attachment means for mounting tie first seed boot on the cultivator shank on a rear side of the cultivator shank;
at least one second seed boot spaced laterally and rearwardly from the first seed boot;
at least one packer wheel positioned rearwardly from the at least one second seed boot and aligned to follow behind the at least one second seed boot;
mounting means for pivotally mounting the at least one packer wheel and the at least one second seed boot on a rear face of the first seed boot; and
biasing means for biasing the at least one packer wheel downwards.

14. A seed boot and packer wheel in accordance with claim 13 wherein the at least one second seed boot includes a coupling engaging an air seeder hose outlet for receiving a flow of granular material from the hose outlet, said at least one second seed boot having a cross sectional area greater than a cross sectional area of the coupling such that the speed of the flow from the hose is decreased.

15. A seed boot and packer wheel in accordance with claim 14 wherein the at least one second seed boot comprises an elongate hollow tubular member having a top end and an open bottom end, said top end being fixed to an outlet end of the coupling for receiving said granular material, said tubular member sloping downwards and rearwards to the open bottom end.

16. A seed boot and packer wheel in accordance with claim 13 wherein the at least one second seed boot comprises a pair of spaced apart second seed boots arranged to lie laterally of the first seed boot, such that one second seed boot lies to each side of the first seed boot.

17. A seed boot and packer wheel in accordance with claim 13 wherein each at least one second seed boot includes adjustment means for vertically adjusting the bottom end thereof.

18. A seed boot and packer wheel in accordance with claim 13 wherein the at least one second seed boot includes a furrow opener fired to a front side of the open bottom end thereof.

19. A seed boot and packer wheel in accordance with claim 13 wherein the biasing means are arranged substantially horizontally, angling downwards and rearwards from a first end to a second end.

* * * * *